United States Patent [19]

Utsch et al.

[11] Patent Number: 5,587,036

[45] Date of Patent: Dec. 24, 1996

[54] PROCESS FOR THE PRODUCTION OF BLANKS FOR MOTOR VEHICLE LICENSE PLATES

[75] Inventors: Joachim Utsch, Alte Dreisbachstr. 19, 5900 Siegen; Gerhard Utsch; Manfred Utsch, both of Siegen, all of Germany

[73] Assignee: Joachim Utsch, Siegen, Germany

[21] Appl. No.: 808,768

[22] Filed: Dec. 17, 1991

[30] Foreign Application Priority Data

Dec. 17, 1990 [DE] Germany ............... 40 40 386.6

[51] Int. Cl.$^6$ ............... B32B 31/16; B60R 13/10
[52] U.S. Cl. ............... 156/219; 156/220; 156/240; 40/200
[58] Field of Search ............... 156/219, 220, 156/223, 240, 280, 209; 40/200, 208, 616; 427/275, 284

[56] References Cited

U.S. PATENT DOCUMENTS

| | | | |
|---|---|---|---|
| 1,629,944 | 5/1927 | Adams | 427/275 |
| 2,012,346 | 8/1935 | Meehan | 40/200 |
| 2,587,325 | 2/1952 | Husted | 40/208 |
| 3,895,987 | 7/1975 | Loreck | 156/303.1 X |
| 4,420,515 | 12/1983 | Amon et al. | 428/29 |
| 4,510,006 | 4/1985 | Lawson | 156/254 X |
| 4,919,741 | 4/1990 | Chirhart et al. | 156/268 X |

FOREIGN PATENT DOCUMENTS

| | | | |
|---|---|---|---|
| 2646109 | 10/1990 | France . | |
| 475798 | 5/1929 | Germany . | |
| 1772467 | 4/1971 | Germany . | |
| 3203801 | 11/1988 | Germany . | |
| 3741232 | 6/1989 | Germany . | |
| 2197976 | 6/1988 | United Kingdom | 40/208 |
| WO90/07994 | 7/1990 | WIPO . | |

*Primary Examiner*—Michele K. Yoder
*Attorney, Agent, or Firm*—Young & Thompson

[57] ABSTRACT

In order to provide, during final production, the raised symbols of reflectorized motor vehicle license plates permanently with paint in the hot-embossing process, and to be able to use therein a narrower and thus less expensive, heat-releasable paint layer provided on a synthetic resin carrier film, it is suggested to create the coloring of the rim already prior to cutting off the blank of the license plate and prior to embossing the plate rim.

1 Claim, 1 Drawing Sheet

PROCESS FOR THE PRODUCTION OF BLANKS FOR MOTOR VEHICLE LICENSE PLATES

FIELD OF THE INVENTION

The invention relates to a process for the production of blanks for automotive vehicle license plates wherein the raised rims and symbols are colored by pressure application of a synthetic resin film strip which latter is coated with a heat-releasable paint, an aluminum sheet strip being first of all unreeled from a coil, a reflective synthetic resin film then being laminated onto this strip, and individual plate blanks being thereupon cut off and provided with an embossed rim.

BACKGROUND OF THE INVENTION

In DE 3,741,232 A1, it has already been noted that it is difficult to find a permanent paint which adheres well to the reflective synthetic resin film for the conventional roller coating process for coloring the raised rims and symbols of the plate. DE 3,741,232 A1 provides a device for the coloring of embossed plates, especially motor vehicle license plates, making it possible to color, in an economical way, the raised rims and symbols of motor vehicle license plates with a heat-applicable, permanent paint. In this method, the paint is detached from a carrier film by means of a heated pressure roll and is applied to the symbols and rims of the plate.

The carrier film with paint layer is reeled off, in this method, from a take-off reel, and after the paint layer has been applied, the consumed carrier film is wound up on a take-up reel. The minimum width of the synthetic resin film, coated with heat-detachable paint, must correspond to the width of a motor vehicle license plate. The film strip and, in particular, the paint layer, are relatively expensive so that license plates colored by hot embossing likewise become relatively costly.

SUMMARY OF THE INVENTION

The invention is directed to this aspect, presenting the "in-the-field" plate embosser with plate blanks already exhibiting a colored embossed rim so that the final plate manufacturer and retailer, when coloring the numbers and letters embossed by him with the use of the device according to the aforementioned DE 3,741,232 A1, can utilize a narrower and thus less expensive synthetic resin film coated with heat-releasable paint.

In order to make this possible, the process of this invention provides, in the production of a blank for motor vehicle license plates, that the coloring of the rim is created prior to cutting off the blank and embossing of the rim thereof.

The coloring of the rim can be done in various ways. A prerequisite is that the coloring of the rim be as resistant as the paint applied subsequently to the raised symbols by hot embossing.

A reflective film can be applied by laminating during the manufacture of the license plate blanks, this film already including the rim coloring of the plate. By means of appropriate scanning devices (scanners), it can be ensured that the rim, after the reflective film has been applied by laminating, will be embossed precisely at the location where the rim coloring is present.

It is also possible to use physically drying varnishes, or stoving varnishes, for the separate rim painting.

The separate coloring of the plate rim can be integrated into a method as described in German Patent 3,203,801, with the exception that the embossing press included therein as the paging device for the letters and numbers (legends) of the license plates is not needed, but rather only the embossing tools are required for the plate rim.

The process is applicable not only in case of fully coated blanks, but also in case of partially coated plate blanks, i.e. those wherein the reflective film has been laminated only onto the area within the plate rim rather than onto the rim proper. In this process, the starting material employed is normally a unilaterally white-painted and/or primed aluminum strip wound up into a coil, so that even simpler coloring varnishes can be utilized on the white-painted and/or primed plate rim, which varnishes show adequate adherence to a paint primer while they are not so durable on the reflective synthetic resin film, as mentioned above. In this connection, watercolor paint and ink can also be considered, which penetrate into the paint primer.

In the fully automated mass production of the blanks for motor vehicle license plates, the additional coloring of the plate rim will be of little consequence whereas the final consumer, i.e. the "run-of-the-mill" plate maker, who embosses the legends of the license plates and who colors with heat-applicable colored film, can use the cheaper, narrower carrier film, or a carrier film with narrower bands of heat-releasable paint, so that there, at the terminal of license plate manufacture, costs can be saved also for the vehicle owner, and yet the presently prescribed reflectorized automotive vehicle license plates are colored in permanent fashion.

BRIEF DESCRIPTION OF THE DRAWING

The above and other objects, features and advantages of the present invention will become apparent from a consideration of the following more detailed description, taken in connection with the accompanying drawing, in which.

DETAILED DESCRIPTION OF THE PREFERRED EMBODIMENT

As a first step, the metal strip is unrolled from a roll thereof and laminated to the film.

Figure 1:
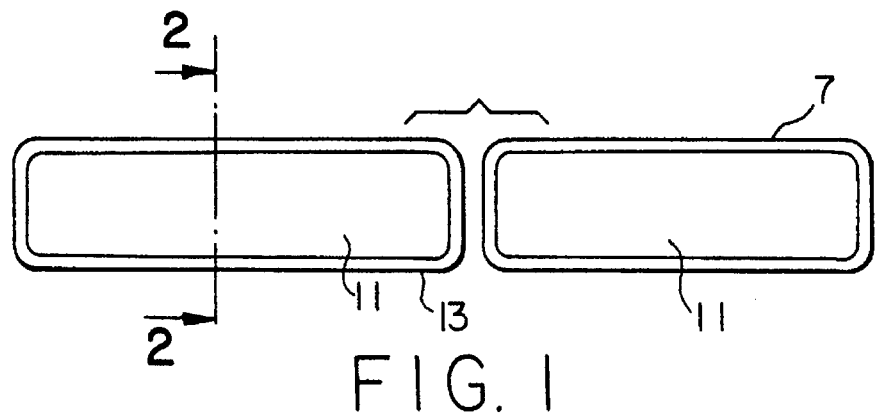
FIG. 1 is a view of stamped and embossed plate blanks.
Figure 2:
FIG. 2 is an enlarged cross-sectional view on the line 2—2 of FIG. 1.

The next step in the production of the blanks is to sever them and emboss them to produce the blanks shown in FIGS. 1 and 2. A conventional stamping step is used to sever them, as well as a conventional embossing step, only the rim being embossed, so that there is produced a severed blank 11 having an embossed rim 13.

Figure 3:
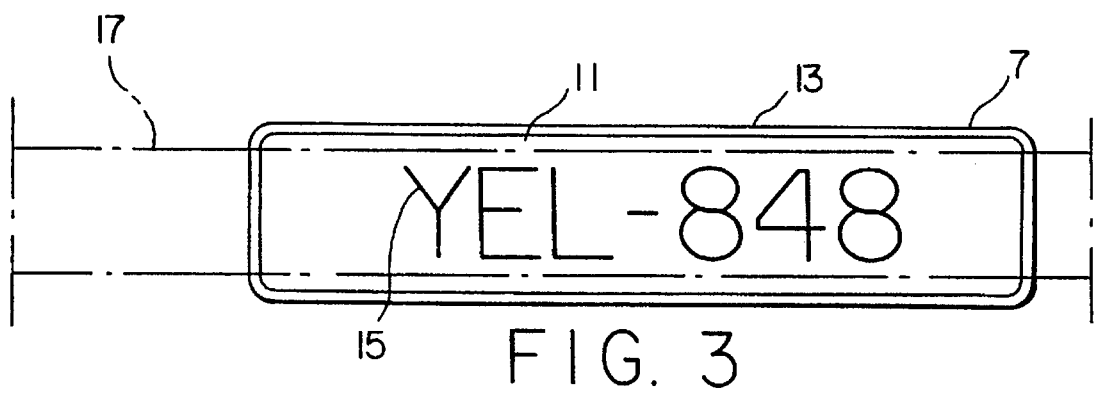
FIG. 3 is a schematic view showing the final steps in the production of license plates using blanks according to the present invention.

The final steps in the production of license plates are indicated in FIG. 3. These steps are performed in the field in the sense that the stamped blanks 11 with embossed rims 13 are supplied to the license plate producers of the various states or other jurisdictions. These latter then emboss the individual numbers and characters on the blanks, as shown at 15 in FIG. 3.

As is also shown in FIG. 3, the embossed characters are then provided with a coating of heat-releasable paint carried on a strip 17 which is overlaid on the blanks 11 so as to cover the characters 15 but not the upper and lower rims 13. The strip 17 thus need not be much wider than the height of the characters 15, thereby saving material and hence reducing the cost of production. The strip 17 is hot pressed against the characters 15 to transfer the heat-releasible paint from the underside of strip 17 to the characters 15, thereby giving them contrast with the background of the plate.

We claim:

1. A process for the production of automotive vehicle license plates, comprising unreeling from a coil a continuous length of metal strip, applying to said length of metal strip a colored film that imparts to said strip a series of colored rims, severing said length of strip into individual license plate blanks bordered by said rims and embossing only said rims thereby to produce raised rims about the periphery of each severed blank, subsequently embossing on said blank individual characters identifying a particular automotive vehicle, and applying to said characters a paint of a color contrasting with the background of said characters by applying to said characters a strip bearing said paint and having a width substantially less than the distance between upper and lower said rims of said blank.

* * * * *